United States Patent
Lee

(10) Patent No.: US 9,256,325 B2
(45) Date of Patent: Feb. 9, 2016

(54) CURVED DISPLAY APPARATUS FOR VEHICLE

(71) Applicant: Hyundai Motor Company, Seoul (KR)

(72) Inventor: Jong Bok Lee, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/445,684

(22) Filed: Jul. 29, 2014

(65) Prior Publication Data

US 2015/0169135 A1   Jun. 18, 2015

(30) Foreign Application Priority Data

Dec. 18, 2013   (KR) .................. 10-2013-0157982

(51) Int. Cl.
| | |
|---|---|
| *G06F 3/042* | (2006.01) |
| *G03B 21/28* | (2006.01) |
| *G03B 21/60* | (2014.01) |
| *G06F 3/0484* | (2013.01) |
| *G06F 3/0488* | (2013.01) |
| *G06F 3/041* | (2006.01) |
| *B60K 35/00* | (2006.01) |

(52) U.S. Cl.
CPC .............. *G06F 3/0426* (2013.01); *B60K 35/00* (2013.01); *G03B 21/28* (2013.01); *G03B 21/60* (2013.01); *G06F 3/0416* (2013.01); *G06F 3/0421* (2013.01); *G06F 3/0488* (2013.01); *G06F 3/04842* (2013.01); *B60K 2350/1004* (2013.01); *B60K 2350/1028* (2013.01); *B60K 2350/2013* (2013.01); *B60K 2350/2052* (2013.01); *G06F 2203/04109* (2013.01); *G06F 2203/04802* (2013.01)

(58) Field of Classification Search
None
See application file for complete search history.

(56) References Cited

U.S. PATENT DOCUMENTS

| | | | |
|---|---|---|---|
| 2002/0039229 A1* | 4/2002 | Hirose et al. .................. | 359/451 |
| 2004/0140959 A1* | 7/2004 | Matsumura et al. .......... | 345/173 |
| 2009/0085892 A1* | 4/2009 | Ishikura et al. ............... | 345/174 |
| 2012/0287663 A1* | 11/2012 | Lathrop et al. ................ | 362/558 |
| 2014/0084617 A1* | 3/2014 | Blank et al. .................... | 296/70 |
| 2014/0347303 A1* | 11/2014 | El Khoury .................... | 345/173 |
| 2015/0169077 A1* | 6/2015 | Lee ............................... | 345/184 |

FOREIGN PATENT DOCUMENTS

| | | |
|---|---|---|
| JP | 2006-018140 A | 1/2006 |
| JP | 2012-101743 A | 5/2012 |

(Continued)

*Primary Examiner* — David D Davis
(74) *Attorney, Agent, or Firm* — McDermott Will & Emery LLP

(57) ABSTRACT

A curved display apparatus includes a projector, first and second mirrors, a curved screen, an infrared illuminator, an infrared camera, and a controller. The projector is configured to project an image onto a projection area. The first mirror is configured to reflect the image projected from the projector. The second mirror is configured to reflect the image reflected from the first mirror. The curved screen is configured to display the image reflected from the second mirror. The infrared illuminator is configured to output infrared rays onto the curved screen. The infrared camera is configured to capture an infrared image of the curved screen. The controller is configured to determine the image displayed on the curved screen and control the projector according to the determined image, determine a light reflection area based on the infrared image, and control the projector to rearrange an image displayed in the light reflection area.

9 Claims, 3 Drawing Sheets

(56) References Cited

FOREIGN PATENT DOCUMENTS

| | | |
|---|---|---|
| JP | 2012-210828 A | 11/2012 |
| JP | 2013-067209 A | 4/2013 |
| KR | 10-1134383 B1 | 4/2012 |
| KR | 10-2013-0064003 A | 6/2013 |
| KR | 10-2013-0091711 A | 8/2013 |

* cited by examiner

_US 9,256,325 B2_

CURVED DISPLAY APPARATUS FOR VEHICLE

CROSS-REFERENCE TO RELATED APPLICATION

This application claims benefit of priority to Korean Patent Application No. 10-2013-0157982 filed in the Korean Intellectual Property Office on Dec. 18, 2013, the entire contents of which are incorporated herein by reference.

TECHNICAL FIELD

The present inventive concept relates to a curved display apparatus for a vehicle. More particularly, the present inventive concept relates to a curved display apparatus which detects a light reflection area where light reflection occurs and rearranges an image projected onto an area corresponding to the light reflection area.

BACKGROUND

The screen size of a display apparatus mounted within a vehicle has increased over the years. The increase in screen size is advantageous in terms of visibility of a driver, but may be a drawback in terms of light reflection. That is, an area where light reflection occurs may increase in proportion to the screen size.

Examples of external light interference that causes the light reflection may be sunlight, a streetlight, or a headlight of another vehicle. Particularly, when the sunlight is reflected from the screen, the visibility of the driver is significantly deteriorated.

Since the light reflection that occurs on the screen influences driving stability, the light reflection needs to be aggressively prevented.

A reflection reduction film may be attached to the screen in order to prevent the light reflection, but cost of the display apparatus may be increased and display quality may be deteriorated.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a curved display apparatus for a vehicle having advantages of detecting a light reflection area where light reflection occurs and rearranging an image projected onto an area corresponding to the light reflection area.

One aspect of the present inventive concept relates to a curved display apparatus for a vehicle, including a projector, first and second mirrors, a curved screen, an infrared illuminator, an infrared camera, and a controller. The projector is configured to project an image onto a predetermined projection area. The first mirror is configured to reflect the image projected from the projector. The second mirror is configured to reflect the image reflected from the first mirror. The curved screen is configured to display the image reflected from the second mirror. The infrared illuminator is configured to output infrared rays onto the curved screen. The infrared camera is configured to capture an infrared image of the curved screen. The controller is configured to determine the image displayed on the curved screen and control the projector according to the determined image, determine, a light reflection area on the curved screen based on the infrared image, and control the projector to rearrange an image that is displayed in the light reflection area.

The controller may be configured to control the projector to display a black image in the light reflection area.

The first mirror may be an aspherical mirror manufactured based on a curvature value of the curved screen.

The image displayed on the curved screen may include a user interface configured with a plurality of selectable objects, and the controller may be configured to control the projector to display the plurality of objects in an area except for the light reflection area.

The controller may be configured to determine a touched position on the curved screen based on the infrared image.

The curved display apparatus may further include an application driver configured to execute an application function according to control instructions of the controller, wherein when it is determined that the position corresponds to any one of the plurality of objects, the controller may be configured to generate control instructions for operating an application function mapped to the selected object.

The controller may be configured to determine a display area of each of the plurality of objects based on a selection frequency of each of the plurality of objects.

The controller may be configured to the projector to display a black image in an area within a predetermined range from the light reflection area.

The controller may be configured to determine, as the light reflection area, an area having coordinates of pixels that deviate from a predetermined pixel value range.

According to an aspect of the present inventive concept, the light reflection can be reduced to achieve safety of the driver. In addition, since an additional reflection reduction film is not necessary, the production cost of the curved display apparatus can be reduced.

Further, it is possible to eliminate touch misrecognition which is caused due to the effect of the light reflection.

<Description of Symbols>

Figure 1:
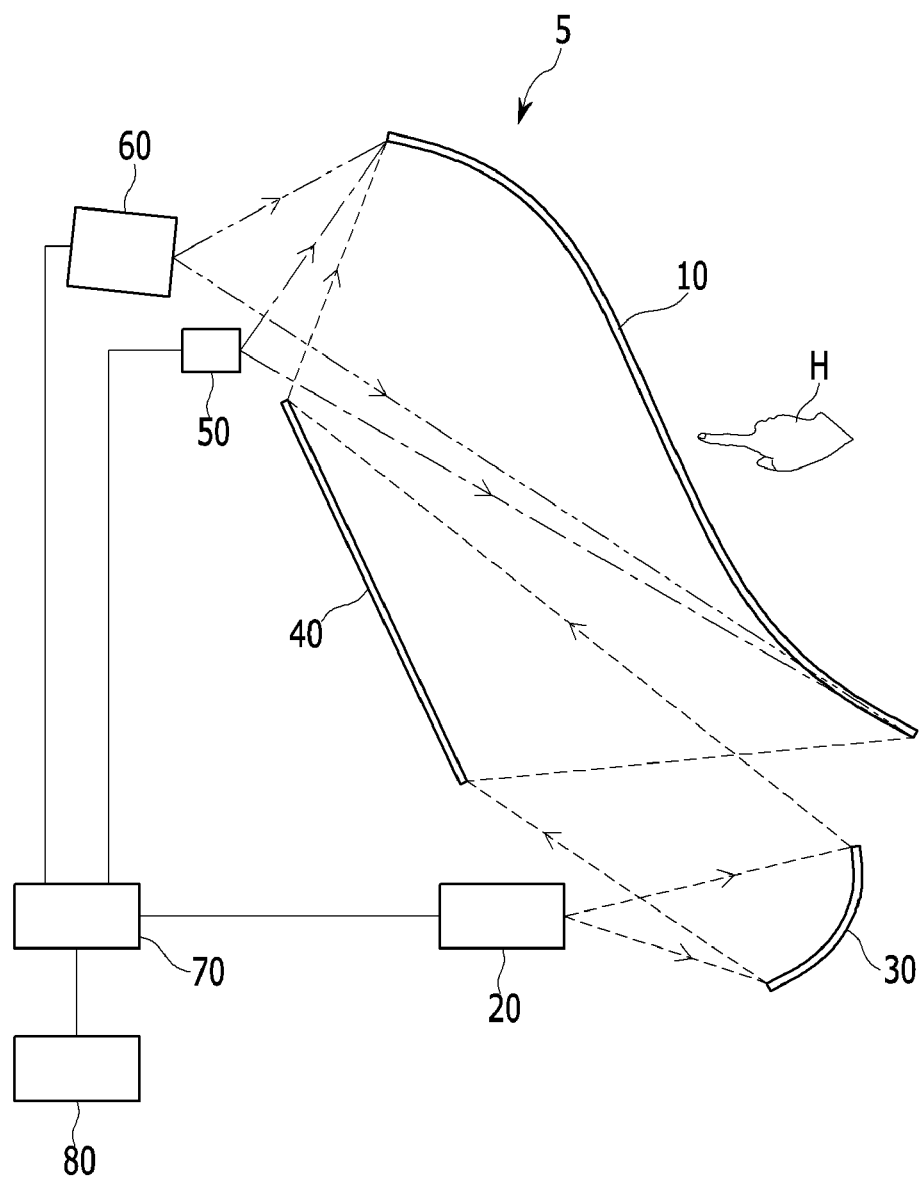
FIG. 1 is a schematic diagram of a curved display apparatus for a vehicle according to an exemplary embodiment of the present inventive concept.

| | |
|---|---|
| 5: Curved display apparatus | 10: Curved screen |
| 20: Projector | 30: First mirror |
| 40: Second mirror | 50: Infrared illuminator |
| 60: Infrared camera | 70: Controller |
| 80: Application driver | |

DETAILED DESCRIPTION OF THE EMBODIMENTS

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

Parts that are irrelevant to the description will be omitted to clearly describe the present inventive concept, and the same or similar elements will be designated by the same reference numerals throughout the specification.

Further, since each component shown in the drawings is arbitrarily illustrated for easy description, the present inventive concept is not particularly limited to the component illustrated in the drawings.

Figure 2:
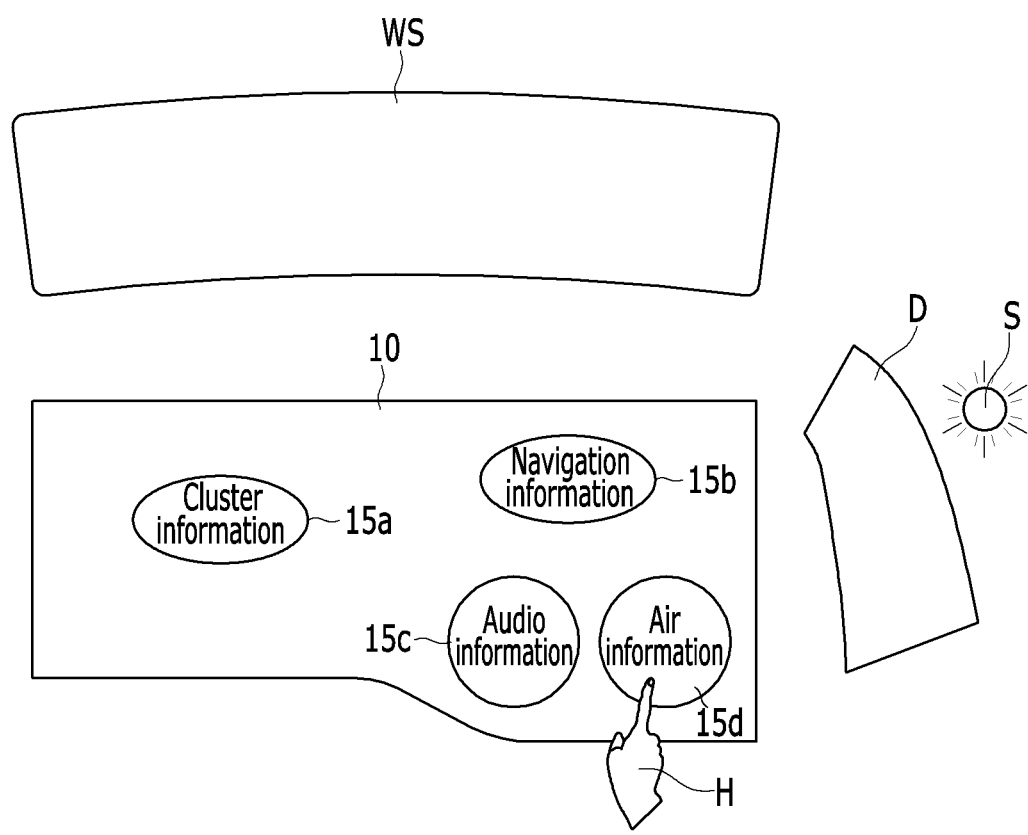
FIG. 2 is a conceptual diagram illustrating an image displayed on a curved screen according to an exemplary embodiment of the present inventive concept.

FIG. 1 is a schematic diagram of a curved display apparatus for a vehicle according to an exemplary embodiment of the present inventive concept. FIG. 2 is a conceptual diagram illustrating an image displayed on a curved screen according to an exemplary embodiment of the present inventive concept.

As shown in FIG. 1 and FIG. 2, a curved display apparatus 5 for a vehicle according to an exemplary embodiment of the present inventive concept may include a curved screen 10, a projector 20, a first mirror 30, a second mirror 40, an infrared illuminator 50, an infrared camera 60, and a controller 70.

The curved display apparatus 5 may be provided in a dashboard of a vehicle according to an interior design of the vehicle. The curved screen 10 may be made of a transparent acryl material so as to display an image.

Referring to FIG. 2, the curved screen 10 may be exposed to external light interference (S) passing through a windshield glass (WS) or a door glass (D). Particularly, the curved screen 10 may tend to be exposed to external light interference (S) passing through the door glass (D) of a side of a passenger where a steering wheel is absent.

The projector 20 may project an image onto a predetermined projection area. The image may be displayed on the curved screen 10 and may be visually recognized by a viewer such as a driver. The controller 70 may receive external video signals to determine an image to be displayed on the curved screen 10, and may control the projector 20 according to the determined image.

The image may include vehicle speed information, engine speed information, coolant temperature information, fuel level information, accumulated distance information, traveled distance information, operating state information of lamps (e.g., turn signal lamps or high beam lamps), operating state information of devices (e.g., doors, seat belts, or a battery), and the like. That is, the image may include an object 15a (see FIG. 2) corresponding to information provided from an existing cluster apparatus.

In addition, the image may further include navigation device information, audio device information, and air conditioner information. That is, the image may further include a user interface configured with a plurality of selectable objects 15b, 15c, and 15d corresponding to various buttons and screens that are provided on an existing dashboard to operate a navigation device, an audio device, and an air conditioner.

Here, an object refers to information that is selected and controlled by a user. For example, the object may be an image, an icon, a folder icon, text, content, a list, and the like.

The navigation device information may include a navigation menu configured with a plurality of selectable objects, a present position of the vehicle, route guidance on a map, and the like. The audio device information may include an audio menu configured with a plurality of selectable objects, volume, a sound source being currently played, a radio channel frequency, and the like. The air conditioner information may include an air-conditioning menu, current temperature, amount of air flow, and the like.

Referring to FIG. 1, the first mirror 30 and the second mirror 40 may be disposed between the curved screen 10 and the projector 20. The image projected from the projector 20 may be reflected to the second mirror 40 via the first mirror 30. The image reflected from the second mirror 40 may be projected to the curved screen 10 and then displayed to the user.

The first mirror 30 may be an aspherical mirror that is manufactured based on a curvature value of the curved screen 10. In addition, by using the first mirror 30, the path depth of light required for displaying an image on the curved screen 10 can be controlled such that the size of the curved display apparatus 5 is reduced.

In order to detect a light reflection area, the infrared illuminator 50 and the infrared camera 60 may be used. The infrared illuminator 50 may output infrared rays to the curved screen 10.

The infrared camera 60 may capture an infrared image corresponding to the entire area of the curved screen 10. The infrared camera 60 may process an image frame such as a still image or a motion picture which is obtained by an image sensor in a capture mode. The processed image frame may be transmitted to the controller 70.

Referring to FIG. 1, an image which is projected by the projector 20 may be indicated by dotted lines, an infrared illumination area is indicated by one-point chain lines, and a captured area is indicated by two-point chain lines.

The controller 70 may be electrically connected to the projector 20, the infrared illuminator 50, and the infrared camera 60, and may be implemented with one or more microprocessors executed by a predetermined program. The predetermined program may include a series of commands for performing each step included in a method for controlling the projector 20 to display images according to an exemplary embodiment of the present inventive concept.

The curved display apparatus for the vehicle according to an exemplary embodiment of the present inventive concept may further include an application driver 80 executing an application function according to control instructions of the controller 70.

When the user's hand (H) touches any position on the curved screen 10, infrared rays may be reflected and the infrared camera 60 may capture the reflected infrared image. The controller 70 may determine a touched position based on the infrared image.

The image displayed on the curved screen 10 may include a user interface configured with the plurality of selectable objects 15b, 15c, and 15d.

The user may select a desired object 15d among the plurality of objects 15b, 15c, and 15d. In this case, the controller 70 may generate control instructions to operate an application function mapped to the selected object 15d, and output the control instructions to the application driver 80. Here, the application function may be one of various application functions of a plurality of electronic devices (e.g., a navigation device, an audio device, or an air conditioner) provided in the vehicle.

Hereinafter, a method for detecting an area where light reflection occurs and rearranging an image projected onto the corresponding area according to an exemplary embodiment of the present inventive concept will be described with reference to FIG. 2 and FIG. 3.

As shown in FIG. 2, the image displayed on the curved screen 10 may include the user interface configured with the plurality of objects 15a, 15b, 15c, and 15d. The object 15a, which may include the vehicle speed information and the engine speed information, may be displayed at a left side of the curved screen 10. The object 15b corresponding to the navigation device information, the object 15c corresponding to the audio device information, and the object 15d corresponding to the air conditioner information, which can be selected by the user, may be displayed at a right side of the curved screen 10.

Figure 3:
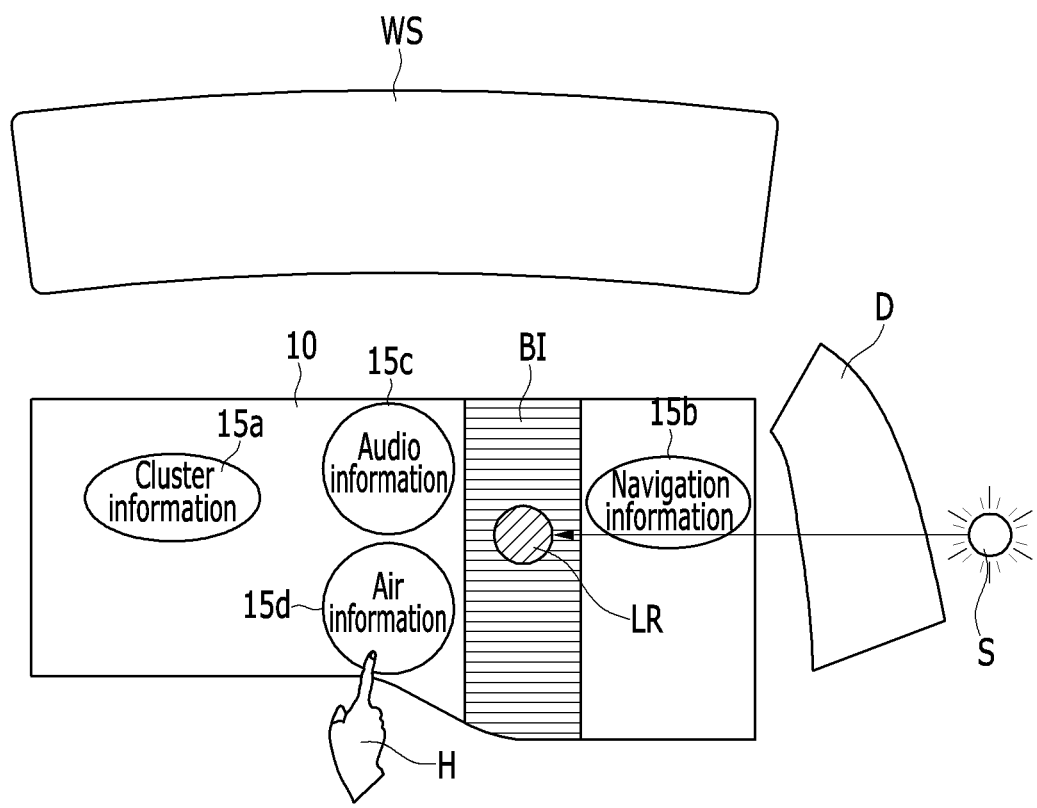
FIG. 3 is a conceptual diagram illustrating an image displayed on a curved screen when light reflection is generated according to an exemplary embodiment of the present inventive concept.

FIG. 3 is a conceptual diagram illustrating an image displayed on a curved screen when light reflection is generated according to an exemplary embodiment of the present inventive concept.

As shown in FIG. 3, a light reflection area (LR) may be generated on the curved screen 10 by the external light interference (S).

The controller 70 may determine the light reflection area (LR) on the curved screen 10 based on the infrared image captured by the infrared camera 60. For example, the controller 70 may use pixel values that are included in the image frame and determine, as the light reflection area (LR), an area having coordinates of pixels that deviate from a predetermined pixel value range.

The controller 70 may control the projector 20 to rearrange the image that is displayed in the light reflection area (LR). The controller 70 may control the projector 20 to display the image in an area other than the light reflection area (LR).

The controller 70 may control the projector 20 to display a black image (BI) in the light reflection area (LR). In this case, the controller 70 may control the projector 20 to display the black image (BI) in a corresponding area within a predetermined range from the light reflection area (LR). Therefore, a glare effect to the driver caused by the light reflection can be prevented.

The controller 70 may determine a display area of each of the plurality of objects 15b, 15c, and 15d based on a selection frequency of each of the plurality of objects 15b, 15c, and 15d. For example, if the selection frequencies of the objects 15c and 15d corresponding to the audio device information and the air conditioner information are higher than the selection frequency of the object 15b corresponding to the navigation device information, the objects 15c and 15d may be displayed at the left of the light reflection area (LR) and object 15b may be displayed at the right of the light reflection area (LR). That is, the objects 15c and 15d, which are frequently selected by the user, may be displayed closer to the driver.

As described above, according to an exemplary embodiment of the present inventive concept, the light reflection can be reduced to achieve safety of the driver. In addition, since an additional reflection reduction film is not necessary, the production cost of the curved display apparatus 5 can be reduced.

Further, it is possible to eliminate touch misrecognition which is caused due to the effect of the light reflection.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A curved display apparatus for a vehicle, comprising:
a projector configured to project an image onto a predetermined projection area;
a first mirror configured to reflect the image projected from the projector;
a second mirror configured to reflect the image reflected from the first mirror;
a curved screen configured to display the image reflected from the second mirror;
an infrared illuminator configured to output infrared rays onto the curved screen;
an infrared camera configured to capture an infrared image of the curved screen; and
a controller configured to determine the image displayed on the curved screen and control the projector according to the determined image,
wherein the controller is configured to determine a light reflection area on the curved screen based on the infrared image and control the projector to rearrange an image that is displayed in the light reflection area.

2. The curved display apparatus of claim 1, wherein the controller is configured to control the projector to display a black image in the light reflection area.

3. The curved display apparatus of claim 1, wherein the first mirror is an aspherical mirror manufactured based on a curvature value of the curved screen.

4. The curved display apparatus of claim 1, wherein
the image displayed on the curved screen comprises a user interface configured with a plurality of selectable objects, and
the controller is configured to control the projector to display the plurality of objects a region except for the light reflection area.

5. The curved display apparatus of claim 4, wherein the controller is configured to determine a touched position on the curved screen based on the infrared image.

6. The curved display apparatus of claim 5, further comprising
an application driver configured to execute an application function according to control instructions of the controller,
wherein when it is determined that the touched position corresponds to any one of the plurality of objects, the controller is configured to generate control instructions for operating an application function mapped to the selected object.

7. The curved display apparatus of claim 4, wherein the controller is configured to determine a display area of each of the plurality of objects based on a selection frequency of each of the plurality of objects.

8. The curved display apparatus of claim 1, wherein the controller is configured to the projector to display a black image in a region within a predetermined range from the light reflection area.

9. The curved display apparatus of claim 1, wherein the controller is configured to determine, as the light reflection area, a region having coordinates of pixels that deviate from a predetermined pixel value range.

* * * * *